United States Patent
Ou et al.

(10) Patent No.: US 12,113,796 B2
(45) Date of Patent: Oct. 8, 2024

(54) SECURED DATA ACCESS IN VIRTUAL DATA PROCESSING

(71) Applicant: Hewlett Packard Enterprise Development LP, Houston, TX (US)

(72) Inventors: Xiongbing Ou, Santa Clara, CA (US); Thomas Anthony Phelan, Santa Clara, CA (US); David E. Lee, Houston, TX (US); Ramaswami Kishore, San Francisco, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 332 days.

(21) Appl. No.: 17/708,783

(22) Filed: Mar. 30, 2022

(65) Prior Publication Data
US 2023/0319048 A1    Oct. 5, 2023

(51) Int. Cl.
*H04L 9/32* (2006.01)
*H04L 9/40* (2022.01)
*H04L 67/1097* (2022.01)

(52) U.S. Cl.
CPC ........ *H04L 63/102* (2013.01); *H04L 63/0807* (2013.01); *H04L 63/0884* (2013.01)

(58) Field of Classification Search
CPC ............... H04L 63/102; H04L 63/0807; H04L 63/0884; G06F 21/54; G06F 21/554; G06F 21/566; G06F 21/577; G06F 21/64; G06F 21/44
See application file for complete search history.

(56) References Cited

U.S. PATENT DOCUMENTS

| | | |
|---|---|---|
| 6,003,136 A | 12/1999 | Schanze |
| 7,024,692 B1 | 4/2006 | Schanze et al. |
| 7,461,400 B2 | 12/2008 | Foster et al. |
| 7,519,813 B1 | 4/2009 | Cox et al. |
| 7,904,949 B2 | 3/2011 | Bowers et al. |
| 8,181,236 B2 | 5/2012 | Banerjee et al. |

(Continued)

FOREIGN PATENT DOCUMENTS

WO    WO-2019000092 A1 *    1/2019    ............ G06F 21/33

OTHER PUBLICATIONS

Kushala M V and Dr. B S Shylaja, Recent Trends on Security Issues in Multi-Cloud Computing, Published: 2020, International Conference on Smart Electronics and Communication. (Year: 2020).*

(Continued)

*Primary Examiner* — Chau Le
*Assistant Examiner* — Habibullah
(74) *Attorney, Agent, or Firm* — Trop, Pruner & Hu, P.C.

(57) ABSTRACT

Secured data access in virtual data processing is described. An example includes instructions to receive a request from an application in a compute node of a compute cluster in a virtual data processing environment to access a secured data source for a user, the virtual data processing environment including a multiple secured data sources that are accessible by compute nodes of the virtual compute cluster; fetch a credential in a current application context and forward the credential for validation; validate the credential with a credential authority; and, upon successfully validating the credential, authenticate the user at the secured data source and establish a connection with the secured data source.

20 Claims, 8 Drawing Sheets

(56) References Cited

U.S. PATENT DOCUMENTS

| | | | |
|---|---|---|---|
| 8,756,429 B2 | 6/2014 | Banerjee, Jr. et al. | |
| 8,817,990 B2 | 8/2014 | Oba | |
| 8,898,457 B2 | 11/2014 | Fu et al. | |
| 9,225,525 B2 | 12/2015 | Fu et al. | |
| 2017/0187708 A1* | 6/2017 | Moore | H04L 63/0807 |
| 2018/0084052 A1* | 3/2018 | Trachy | G06F 16/273 |
| 2019/0007409 A1* | 1/2019 | Totale | G06F 21/33 |
| 2019/0334911 A1* | 10/2019 | Parthasarathy | H04L 9/0891 |
| 2020/0382323 A1* | 12/2020 | Keselman | H04L 63/0823 |
| 2020/0403994 A1* | 12/2020 | Bitterfeld | H04L 67/53 |
| 2022/0014517 A1* | 1/2022 | Jain | H04L 63/0807 |
| 2022/0021652 A1* | 1/2022 | Moghe | H04L 63/20 |
| 2022/0060453 A1* | 2/2022 | Crabtree | H04L 63/08 |
| 2022/0103518 A1* | 3/2022 | LaChance | H04L 63/0236 |
| 2022/0200990 A1* | 6/2022 | Madej | H04L 63/0807 |
| 2022/0279023 A1* | 9/2022 | Solari | H04W 12/069 |
| 2022/0286300 A1* | 9/2022 | Draper | H04N 21/25866 |
| 2022/0337578 A1* | 10/2022 | Mankekar | G06F 21/41 |
| 2022/0353261 A1* | 11/2022 | Totale | H04L 63/0807 |
| 2023/0120160 A1* | 4/2023 | Oh | H04L 63/0815 726/5 |
| 2023/0136230 A1* | 5/2023 | Paul | G06Q 20/3674 726/6 |

OTHER PUBLICATIONS

Hussain Al-Aqrabi and Richard Hill, Dynamic Multiparty Authentication of Data Analytics Services within Cloud Environments, Published: Jan. 10, 2019, Centre for Industrial Analytics University of Huddersfield. (Year: 2019).*

* cited by examiner

SECURED DATA ACCESS IN VIRTUAL DATA PROCESSING

BACKGROUND

In large-scale virtual data processing environments, difficulties can arise with regard to compute and storage resources. For this reason, separation of compute and storage has become more prevalent because this can assist in decoupling the compute resources and storage resources from each other.

In a virtual storage system, multiple different compute resources and storage resources may exist for support of many varying applications. For example, the compute resources may include operation of a virtual compute cluster to support varying applications, and the storage resources (which may also be referred to herein as data sources) may include multiple different storage resources that are accessible to certain applications.

However, complications may result from the compute and storage separation when there are multiple storage resources. In such an architecture with separated compute and storage resources, the storage sources may be secured with numerous different security authentication solutions depending on the nature of the data source. Because the security authentication mechanism may be different for different types of data sources, an application running in a compute cluster is generally required to support the specific authentication mechanism for each data source before accessing the data in the data source.

BRIEF DESCRIPTION OF THE DRAWINGS

Examples described here are illustrated by way of example, and not by way of limitation, in the figures of the accompanying drawings in which like reference numerals refer to similar elements.

DETAILED DESCRIPTION

Figure 1:
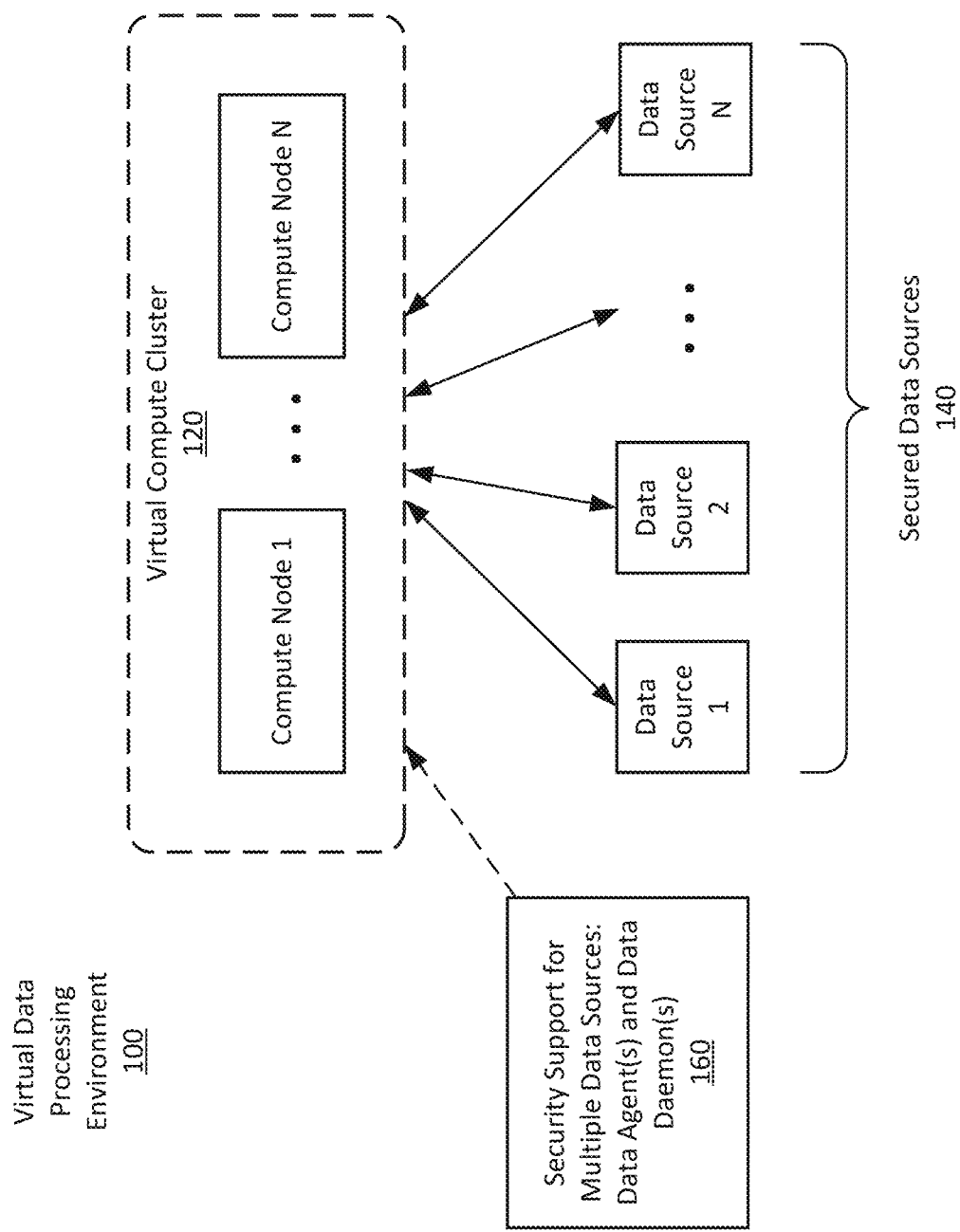
FIG. 1 is an illustration of a virtual data processing environment to provide secured access to multiple data sources, according to some examples.

In virtual data processing, a system may include a compute architecture and a separate storage architecture to provide separation and decoupling between such elements. In a large-scale system, there may be numerous different secured data sources, with each data source being secured with particular authentication technology that is associated with it. In an operation, an application will often access multiple different data sources. In an implementation having multiple data sources with different authentication standards, this generally requires that authentication be successfully established with each of the relevant data sources.

However, in conventional technologies, the authentication with multiple different data sources requires that the application be compatible with each of the relevant authentication technologies. This requirement may greatly increase the complexity of application development and operation as each application may include implementation of multiple security technologies in order to enable the applications to successfully access data sources. Further complexities may arise in operation because, in a large system, an application may be spread across multiple nodes, and thus multiple instances may authenticate with multiple data sources at a same time.

In some examples, to support access by applications running on a virtual compute cluster to multiple different secured data sources at the same time, while also reducing the complexity and cost in development and processing of applications, an apparatus or system includes an authentication support system. The authentication support system provides for an exchange of information to perform authentication with multiple data sources and enable an application to access these data sources without requiring that the application itself support each of the authentication standards. In this manner, a standard application is allowed to operate in a system having separate compute and storage architectures without a requirement for modifying the application to be compatible with each applicable authentication standard. For example, changes may be made in a data lake implementation without a requirement for rewriting one or more applications because such applications can access multiple secured data sources without conforming the application to authentication mechanisms for each such data source.

In some examples, the authentication support system includes a data agent that is deployed to each node of the compute cluster to handle requests for data source access. In addition, the authentication support system further includes a data daemon that is deployed separately from the data agent (such as being deployed outside of a container or virtual machine containing the data agent), the data daemon to validate users and authenticate with the data sources through the authentication mechanisms of the data sources. As used herein, "data agent" refers to a computer program, such as a computer program installed on a node of a compute cluster, and "data daemon" or "daemon" refers to a computer program that runs as a background process in a multitasking operating system.

In some examples, the data agents and data daemon may operate jointly to validate user identity, and then authenticate with a data source's authentication mechanism, thus reducing the authentication requirements and overhead for applications that access multiple data sources in operation. For example, the data agents may implement an API (Application Programming Interface) for data source access. When a user or service for an application running on a node in a compute cluster attempts to access a remote data source through the API, the requests are intercepted by the data agent of the node, with the data agent forwarding the requests to the associated data daemon.

The data daemon is then to validate the user identity in connection with the access request. After successful user identity validation, the data daemon, on behalf of the user, operates to authenticate with the data source through the data source's authentication mechanism. After successful authentication of the user with the data source, the data daemon serves the original request by accessing an API that is provided by the appropriate data source, and the data daemon then may respond to the user's original request based on the response from the data source.

In some examples, a system only requires that an authentication credential (such as a Kerberos credential) be received, while the application itself can be non-Kerberized under the authentication protocol, such that the application running in the compute cluster can access the secured data source with user validation. Further, the HDFS (Hadoop Distributed File System) data source concept is extended to a general secured data source, allowing for access to any of multiple different data sources. HDFS is a distributed file system handling large data sets running on commodity hardware, and Hadoop is a distributed computing framework developed by the Apache Software Foundation.

FIG. 1 is an illustration of a virtual data processing environment to provide secured access to multiple data sources, according to some examples. As illustrated, a Virtual Data Processing Environment 100 includes a Virtual Compute Cluster 120 including one or more host systems. In the illustrated example, the Virtual Compute Cluster 120 includes multiple compute nodes, shown as Compute Node 1 through Compute Node N, to support applications in the Virtual Data Processing Environment 100. Each compute node may be either a container or a virtual machine (VM). As used herein, "virtual machine" refers to a virtualization or emulation of a computer system, and "container" refers to an executable unit of software in which application code is packaged or bundled together with related configuration files, libraries, and dependencies.

The Environment 100 may include decoupled compute and storage resources. In this architecture, the Environment 100 may include multiple Secured Data Sources 140, shown as Data Source 1 through Data Source N, wherein secured data sources may include multiple different types of data sources, each including an applicable security authentication technology. The authentication technologies for the secured data sources may include Kerberos, MapR ticket, OAuth for Google Cloud Storage, Access keys for AWS S3, or others. For this reason, in conventional operation an application running in a compute node within the Virtual Compute Cluster 120 will need to support the specific authentication mechanism for each secured data source within the multiple Secured Data Sources 140 that is accessed by the application in operation. In a specific example of Kerberos authentication technology, if the application that is running in the Virtual Compute Cluster 120 cannot be Kerberized, then the non-Kerberized application would be unable to access the Kerberized data source in conventional technology.

In some examples, a process or system is to support applications running in the Virtual Compute Cluster 120 to access multiple different Secured Data Sources 140 in the separated compute and storage architecture. In some examples, the access includes multiple accesses to a data source in an operation, which may include accesses at a same time or similar time, thus providing support for a job that is spread to multiple nodes in the virtual compute cluster. As illustrated in FIG. 1, one or more hosts of the compute cluster include Security Support 160 for multiple different Secured Data Sources 140, thus allowing for an application to access the multiple data sources without the application being required to be compatible with each of the authentication mechanisms associated with the data source.

In a particular example, the Security Support 160 may allow for a non-Kerberized application to access a Kerberized data source. Further, the Security Support 160 may allow for access by an application to a non-Kerberized data source, allowing additional simplification of operation.

In some examples, the Security Support 160 provides one or more data agents and data daemons in the compute and storage architecture, wherein the security support includes operation of a data agent for an application and a data daemon associated with a relevant host that holds a compute node for the application. For example, a data agent may be deployed to each node of the Virtual Compute Cluster 120, where each node corresponds to a virtual machine or a container. Further, a data daemon is deployed separately from the data agent and is independent of the compute cluster. For example, the compute cluster may include a container or virtual machine including the data agent, with the data daemon being deployed outside of the container or virtual machine. The data daemon may be deployed on the physical host in a separate compute node, or may be otherwise deployed separately from the data agent. In some examples, the data agent deployed to each node of the virtual compute cluster handles requests for data source access, and the data daemon is separately deployed to validate users and authenticate with the data sources through the authentication mechanisms of the data sources.

Figure 2:
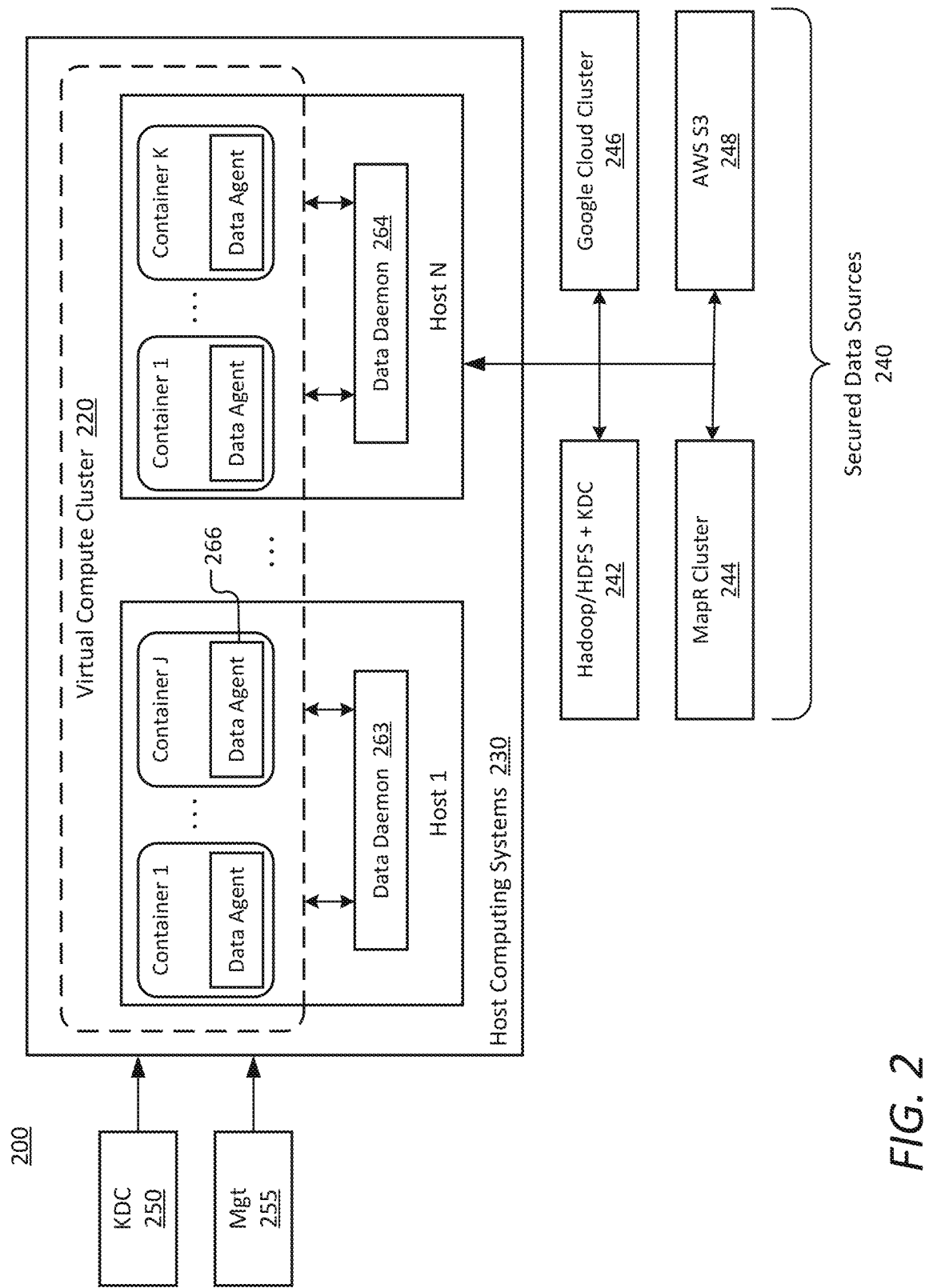
FIG. 2 is an illustration of deployment of elements to provide secured data access in a large-scale virtual data processing environment, according to some examples.

FIG. 2 is an illustration of deployment of elements to provide secured data access in a large-scale virtual data processing environment, according to some examples. In some examples, a Virtual Data Processing System 200 includes one or more Host Computing Systems 230, illustrated as n number of host machines, Host 1 through Host N in FIG. 2. The System 200 further includes a separate set of Secured Data Sources 240, wherein the Secured Data Sources may include varying types of storage technologies, with each data source including an applicable security authentication technology to protect access to the data source. In this illustration, the data sources may include, but are not limited to, a Hadoop Distributed File System (HDFS) with Kerberos Key Distribution Center (KDC) 242; MapR Storage Cluster 244; a Google Cloud Storage Cluster of Google Inc. 246; and AWS (Amazon Web Services) S3 (Simple Storage System) Cloud Storage. The security authentication technologies for the Secured Data Sources 240 may include Kerberos for the HDFS system 242, MapR ticket for the MapR Cluster 244, OAuth for the Google Cloud Cluster 246, Access keys for AWS S3 248, and others. Further, the Secured Data Sources 240 may include applicable APIs, such as Hadoop File System API, MapR file System API, Google Cloud Storage API, AWS S3 API, or other data source API.

The Host Computing Systems 230 may each include one or more compute nodes, which may include one or more containers, virtual machines, or both, wherein the compute nodes on the host systems compose a Virtual Compute Cluster 220. In this particular example, Host 1 is illustrated as including/number of containers indicated as Container 1 through Container J, and continuing through Host N including k number of containers indicated as Container 1 through Container K. (In FIG. 2, n, j, and k may represent any positive integers of 1 or more.) As further illustrated, the system 200 includes an authentication center (indicated as KDC 250 in FIG. 2) to provide for user validation, as further described with regard to FIGS. 3A and 3B. Further, the System 200 may include management (Mgt 255) to manage the Virtual Compute Cluster 220 and configuration information for the Secured Data Sources 240.

In some examples, a user or service in the Virtual Compute Cluster 220 may access multiple Secured Data Sources 240 through operation of data agents and data daemons that are implemented for the purpose of providing authentication services. As illustrated in FIG. 2, each compute node, such as Container 1 through Container J on Host 1 and continuing through Container 1 through Container K on Host N, may include an associated data agent 266, the data agent being deployed to handle requests for data source access. In addition, data daemons, such as data daemon 263 or 264, are separately deployed to validate users and authenticate with the Secured Data Sources 240 through the authentication mechanisms of the data sources.

In this manner, a solution decouples user validation and the data source authentication operations. For example, in Hadoop Distributed File System (HDFS) passthrough DataTap security, before accessing the DataTap, an application in the compute cluster and the HDFS data source are each Kerberized. In contrast, in the solution only the Kerberos credential is required, and the application can be non-Kerberized, such that the non-Kerberized compute cluster can access the secured data source with user validation. Further, the HDFS data source is extended to the general secured data source, such as MapR cluster or Cloud storage, and the data source can use any other security mechanism without necessitating Kerberization.

In an example, data agents and data daemon may work together to enable authentication with different data sources at the same time. Internally, the data daemon maintains each data resource's connection and security authentication information, and creates a separate connection context for each user in the virtual compute cluster to access any data resource.

Figure 3A:
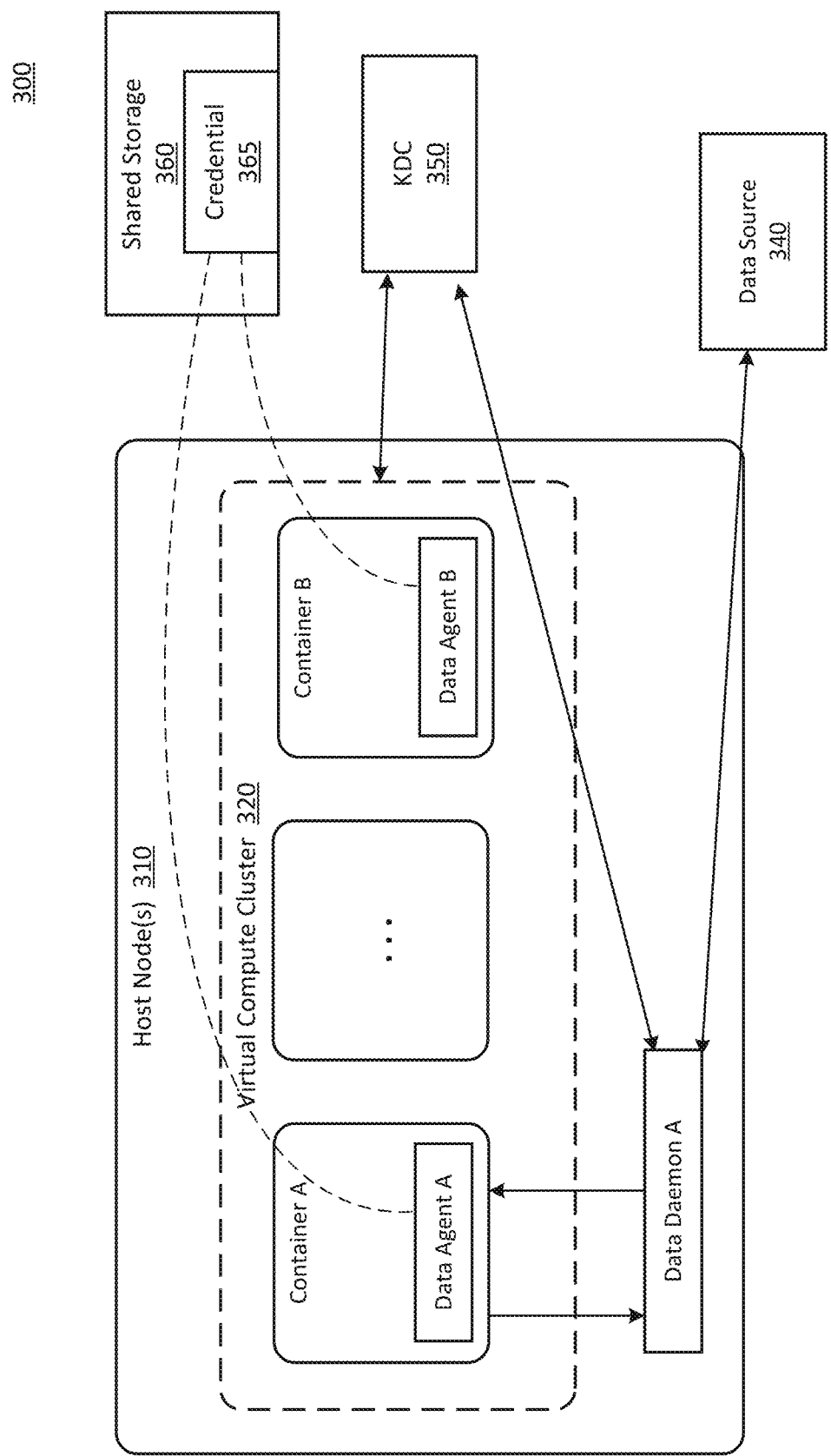
FIG. 3A is an illustration of a system to provide secured data access, according to some examples.

FIG. 3A is an illustration of a system to provide secured data access, according to some examples. In a particular example, a System 300, which may include multiple host nodes, includes Virtual Compute Cluster 320 having multiple compute nodes, such as containers or virtual machines. In this illustration, the Virtual Compute Cluster 320 includes at least a first compute node, Container A, and a second compute node, Container B, to support applications to be run on the System 300. The System 300 further includes at least one authentication center, which may include a Kerberos Key Distribution Center (KDC) (shown as KDC 350) or other center, and one or more data sources for access by the supported applications, including the illustrated Data Source 340. In FIG. 3A, each compute node includes a data agent, such as Data Agent A associated with Container A and Data Agent B associated with Container B, to handle requests for data source access. Further, the System 300 includes one or more data daemons, such as Data Daemon A, that are deployed separately to validate users and authenticate with the data sources through the authentication mechanism of each data source.

In some examples, the data agents may implement an API (Application Programming Interface) for data source access, where the API may include, but is not limited to, the Hadoop Distributed File System (HDFS) API, which models the contents of a file system as a set of paths that are either directories, symbolic links, or files. The S3 Object API is another example of a data source access API. When a user or service for an application running on a node in a compute cluster attempts to access a remote data source through the Hadoop File System API, the requests are intercepted, such as by the data agent of the node, with the data agent forwarding the requests to the associated data daemon. In addition to the request, the data agent also forwards current user context information associated with the request.

In some examples, the data daemon is to validate the user identity based at least in part on the received user context information. User information, such as forwarded POSIX (Portable Operating System Interface developed by IEEE (Institute of Electrical and Electronics Engineers) Computer Society) information, is insufficient for validation of user identity because the forwarded POSIX user could be switched to a POSIX user other than the POSIX user actually running the application on the compute node. In some examples, the user context information includes a Kerberos credential or delegation token, allowing the data daemon to successfully validate the user's identity based on such user context information. As used herein, a delegation token is a security token that is issued to a delegate in order to act as a user.

After successful user identity validation, the data daemon, on behalf of the user, operates to authenticate with the data source through the data source's authentication mechanism. After successful authentication of the user with the data source, the data daemon serves the original request by accessing an API that is provided by the appropriate data source, and the data daemon then may respond to the user's original request based on the response from the data source.

In some examples, a request is made for an authentication credential (such as a Kerberos credential) from a credential authority (e.g., KDC 350), with the credential being received at a compute node within a virtual compute cluster, such as Container A. The container supports an application, and a data agent is deployed in the container. Upon the application attempting to access a remote data source, the associated data agent deployed in the container is invoked. The associated data agent fetches a user credential in a current application context, and the user credential is forwarded to the data daemon for validation. Upon a user or service presenting a command to obtain a user credential, an authentication credential (such as a Kerberos credential from KDC 350) may be received in the relevant compute node, such as Container A. For example, a "kinit" command may be issued to obtain a Kerberos credential that is used in authentication. The kinit command creates a ticket cache in which to store the Kerberos credential. When Data Agent A is invoked by a first application in Container A, Data Agent A may fetch and forward the credential to Data Daemon A to establish a connection with the corresponding data source, Data Source 340. For example, in a Kerberos operation:

When the Compute Cluster 320 is Kerberized, Data Agent A is invoked in a Kerberos secured environment, such that Data Agent A can fetch the Kerberos credential directly based on current Kerberos context.

When the compute cluster 320 is not Kerberized, Data Agent A detects that an existing Kerberos context is not available. Data Agent A may find the Kerberos credential actively by:

Adding a customized configuration property to indicate the location of the Kerberos credential. For example: adding the property "bdfs.kerberos.${USERNAME}.ticket.cache" to the core-site.xml configuration file.

If the credential is not found in the customized configuration, a further search for a credential can be done in a default ticket cache directory, such as /tmp/krb5cc_${UID} or in an environment variable such as KRB5CCNAME. (KRB5CCNAME refers to the default Kerberos credential cache name.)

In a large-scale virtual data processing deployment, a job may be distributed on multiple compute cluster nodes for parallel processing, and thus each of such nodes may need to access the same data source at the same time. To avoid a requirement for providing the authentication credential (a Kerberos Credential in this example) on each node, the Kerberos Credential 365 may be placed on a Shared Storage 360 and a property ("bdfs.kerberos.${USERNAME}.ticket.cache") may be used to indicate the shared location. The shared Kerberos credential may then be accessed by the data agents on each node.

In some examples, Data Daemon A may operate to validate the forwarded Kerberos credential with KDC 350 directly by:
  If a dedicated service principal is configured in KDC 350, Data Daemon A may use the forwarded Kerberos credential to obtain a service ticket.
  If no dedicated service principal is configured in the KDC 350, the data daemon renews the existing Kerberos credential with KDC 350.

After successfully validating the Kerberos credential, Data Daemon A abstracts the Kerberos principal from the Kerberos credential, and obtains the username from the Kerberos principal.

After successfully validating the identity of the current user, Data Daemon A may act as a validated user to connect with Data Source 340 for authentication, with the authentication mechanism being dependent on the data source.

When configuring a data source for access by an application, in addition to the necessary data source type and hostname/IP location of the data source itself, the data source's authentication mechanism and the associated authentication secret are provided. In certain specific examples:
  If the data source is an HDFS storage, the authentication secret is the associated keytab file.
  If the data source is a MapR storage, the authentication secret is the associated MapR ticket file.
  If the data source is a GCS (Google Cloud Storage) storage, the authentication secret is the associated JSON (JavaScript Object Notation) key file.
  If the data source is AWS S3, the authentication secret includes the associated Access keys for the storage (access key ID and secret access key).

In such operation, Data Daemon A may further forward current user information to the Data Source 340 during authentication, which may be utilized in combatting possible cases of impersonation of the user.

After successful authentication and establishment of the connection between the data daemon and the data source, confirmation is provided that the connection has been established successfully. In some examples, the data access may then proceed on behalf of a user.

Figure 3B:
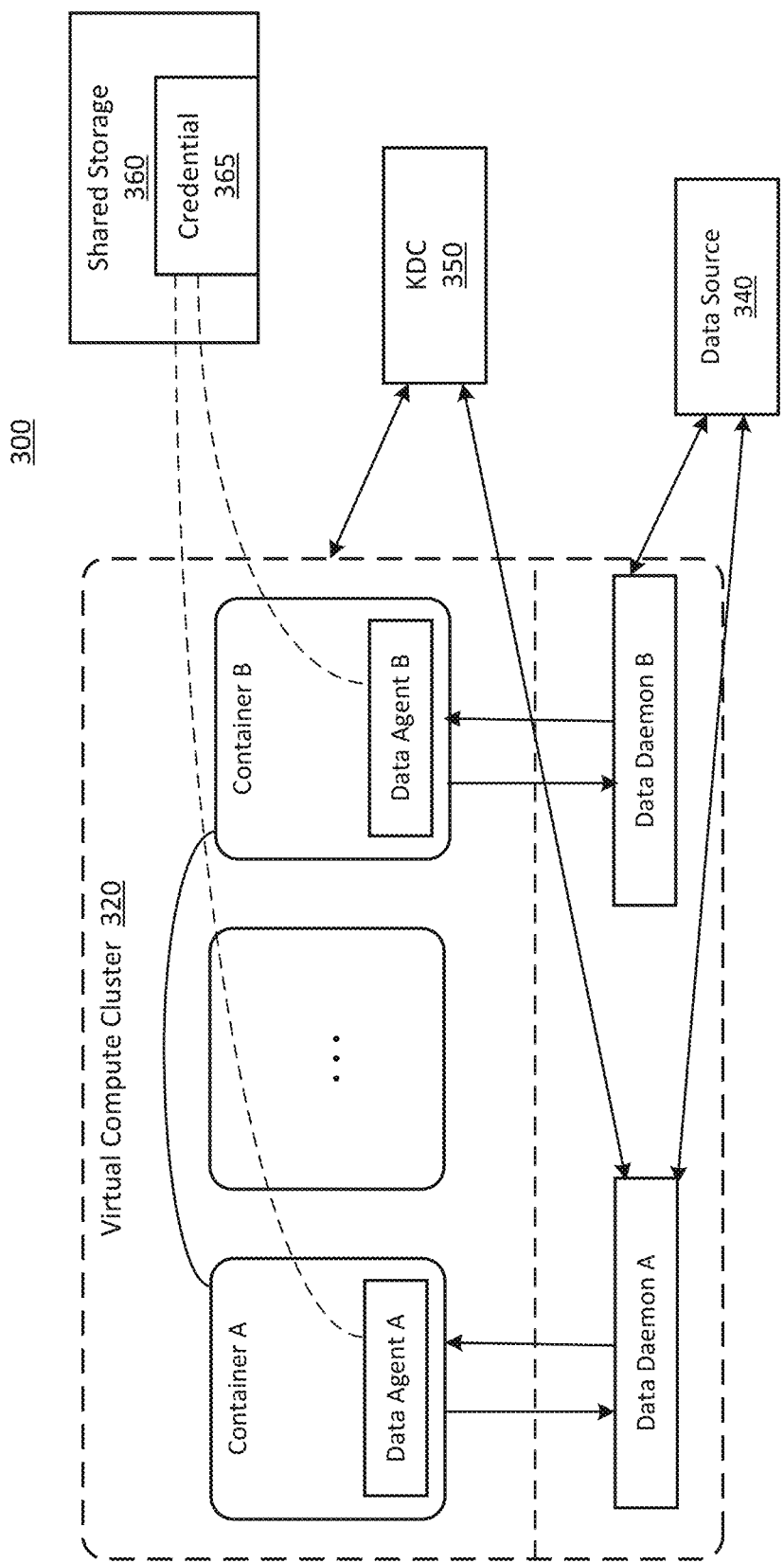
FIG. 3B is an illustration of a system to provide secured data access, according to some examples.

FIG. 3B is an illustration of a system to provide delegated data access, according to some examples. In a particular example, a System 300 again includes Virtual Compute Cluster 320 having multiple compute nodes (containers or virtual machines) such as a first compute node, Container A, and a second compute node, Container B, to support applications to be run on the System 300. The System 300 further includes at least one KDC, shown as KDC 350, or other credential element, and one or more data sources for access by the supported applications, including the illustrated Data Source 340. Each compute node includes a data agent, such as Data Agent A associated with Container A and Data Agent B associated with Container B, to handle requests for data source access. Further, the System 300 includes one or more data daemons, including Data Daemon A and Data Daemon B, that are deployed separately to validate users and authenticate with the data sources through the authentication mechanism specific to each data source. The System 300 may further include a Shared Storage 360 to, for example, hold a credential, such as a Kerberos Credential 365, to support a job that is distributed on multiple compute cluster nodes for parallel processing and avoid a requirement for providing the Kerberos credential on each node.

In some examples, the system may provide for an extended delegation token to reduce the interaction with KDC 350 when the Virtual Compute Cluster 320 is Kerberized. Following successful authentication with Data Source 340, as described above with regard to FIG. 3B, an application may fetch a delegation token through a file system API (Hadoop Distributed File System (getDelegationToken( ) API) based on the connection that has been established with Data Source 340.

Data Daemon A may generate and return a dedicated delegation token that is based on a current validated user, a timestamp, and the data source's authentication secret. The delegation token includes at least two elements, an identifier and password, where these elements may be generated according to the following:
  Identifier: The identifier includes current data source service information (such as hostname or IP address), user information, timestamp (current and expired), and sequence number.
  Password: The password may include an HMAC (Hash-based Message Authentication Code) signature based on the identifier and the data source's authentication secret.

In an example, the delegation token may be forwarded to Container B, such as by a Hadoop delegation token framework. Upon Data Agent B being invoked by the application, Data Agent B obtains the delegation token from its user context and forwards the delegation token to Data Daemon B to establish a connection with the corresponding data source.

In this example, after the Data Daemon B receives the delegation token, it will validate the token. Data Daemon B calculates the HMAC (utilizing the identifier and the data source's authentication secret) and compares the result with the password. If these values don't match, this may indicate that the token has been tampered with, and Data Daemon B will reject the request. If the calculated HMAC value matches the password, Data Daemon B may then continue to validate if the service matches the data source, and check if the timestamp is or is not expired.

After the successful validation of the delegation token, Data Daemon B may obtain the username from the validate token, and on behalf of the validated user, authenticate with the data source based on the data source's authentication information. After successful authentication and establishment of the connection between Data Daemon B with the data source, Data Daemon B confirms that the connection has been established successfully, and can proceed with the data access.

In an alternative example, although the Hadoop Distributed File System API doesn't conform to the POSIX API, the permission model for Hadoop File System for files and directories shares elements of the POSIX model. Cloud storage, such as GCS and AWS S3, generally don't provide POSIX-style access control, and thus don't provide user/group based ACLs.

For cloud storage, a data daemon can utilize a data object's metadata that is provided by the cloud storage to save the user/group information. When accessing the cloud storage through the data agent and the data daemon, the data daemon may also validate the current user, as described with regard to FIG. 3A and FIG. 3B. When creating a directory or file, the data daemon may add the validated user and associated group information to the metadata of the corresponding object that represents the directory or file in the cloud storage.

In this example, the data daemon may apply the POSIX permission model with ACLs (Access Control Lists) when the validated user accesses the directory and file. When listing a directory or reading a file, the data daemon may fetch the metadata of the corresponding object that represents the directory or file in the cloud storage; and then authorize the request based on the validated user and associated group information with file owner/group information that is saved in the metadata.

In another alternative example, if the Data Source 340 also supports Kerberos authentication, such as the Kerberized HDFS, the user validation can be delegated to the data source. In this manner the data daemon is not required to validate the user with the KDC directly, and can use the forwarded Kerberos credential to authenticate with the data source. If the Virtual Compute Cluster 320 is Kerberized and the Data Source 340 supports generating and validating the delegation token, then the delegation token generation/validation can also be delegated to the data source:

In this scenario, if the KDC that is used to Kerberize the compute cluster and the KDC used to Kerberize the data source are different, a cross-realm Kerberos trust may be configured between the two KDCs.

Figure 4:
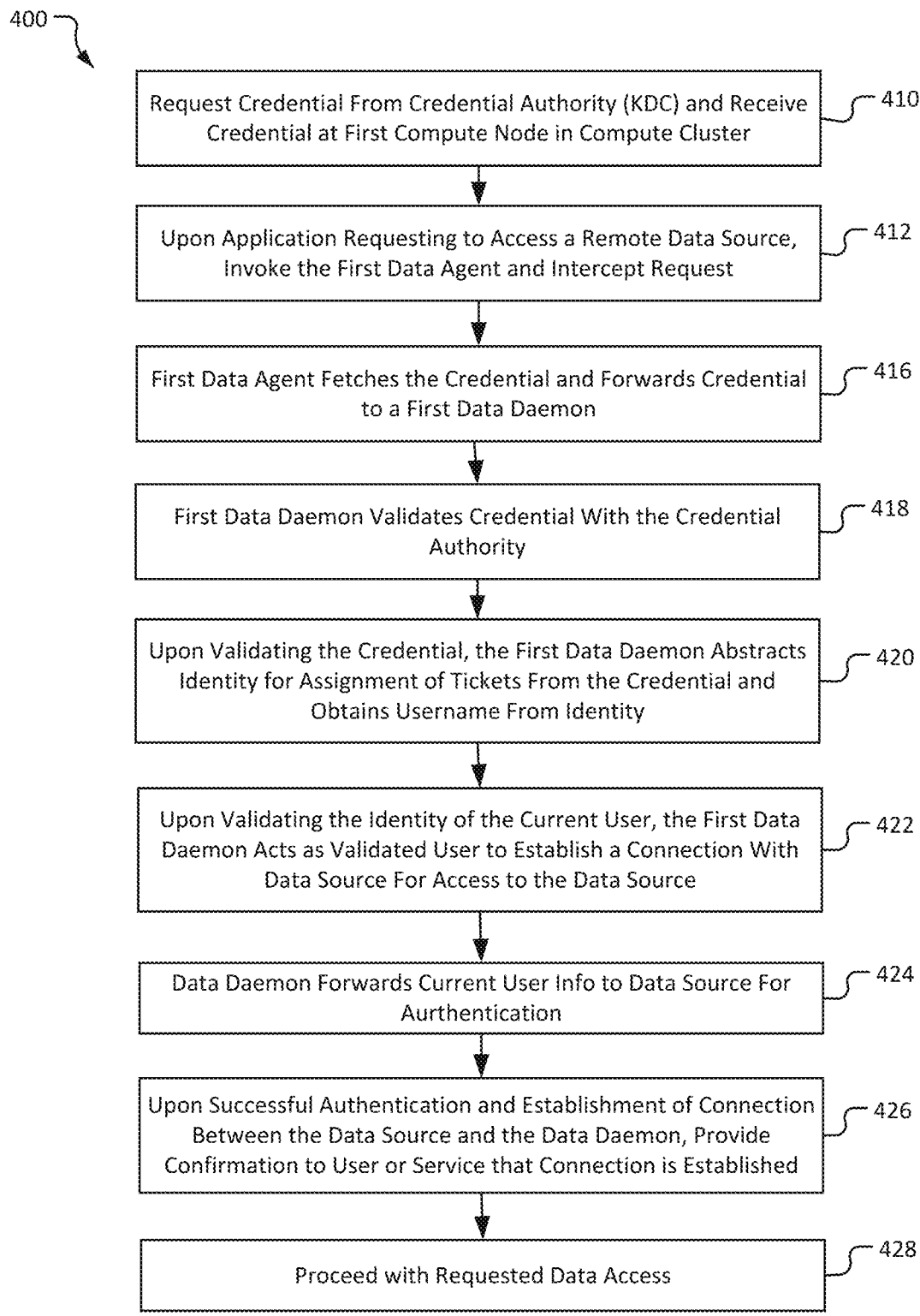
FIG. 4 is a flowchart to illustrate a process to provide secured data access in a virtual data processing environment, according to some examples.

FIG. 4 is a flowchart to illustrate a process to provide secure data access in a virtual data processing environment, according to some examples. In a process 400, a request is made for a security credential (such as a Kerberos credential) from a credential authority (e.g., a KDC) and the credential is received at a first compute node within a virtual compute cluster 410, wherein the compute node supports an application and wherein a first data agent is deployed in the compute node.

Upon the application requesting to access a remote data source, the data agent deployed in the first compute node is invoked 412, and the data agent intercepts the request. The first data agent fetches the credential in a current application context and forwards the credential to a first data daemon (which is deployed separately from the first data agent) to establish a connection with the corresponding data source 416. If the compute cluster is Kerberized, the data agent A will be invoked in a Kerberos secured environment, and the data agent can fetch the Kerberos credential directly based on current Kerberos context. If the compute cluster is not Kerberized, the data agent finds the Kerberos credential actively by adding a customized configuration property to indicate the location of the Kerberos credential. If the credential is not found with the customized configuration, the data agent performs a search in a default directory. In some examples, to avoid providing the credential on each node of the compute cluster, the credential may be placed on a shared storage to be accessed by data agents on all nodes of the compute cluster.

In some examples, the data daemon validates the forwarded user credential directly with the credential authority 418. If a dedicated service principal is configured in the KDC, the data daemon uses the forwarded credential (such as the Kerberos credential) to obtain the service ticket. If no dedicated service principal is configured in the KDC, the data daemon renews the Kerberos credential with KDC.

Upon successfully validating the Kerberos credential, the data daemon abstracts the identity to which the credential authority can assign tickets (the Kerberos principal being the identity to which Kerberos can assign tickets) from the credential, and obtains the username from the identity (Kerberos principal) 420.

Upon successfully validating the identity of the current user, the first data daemon may act as a validated user to establish a connection with the data source for access by the application to the data source 422, with the nature of the authentication mechanism being dependent on the data source. When configuring access to each data source, in addition to the necessary data source type and hostname/IP to connect, the data source's authentication mechanism and the associated authentication secret are provided for authentication. For example, if the data source is HDFS, the authentication secret is the associated keytab file; if the data source is MapR storage, the authentication secret is the associated MapR ticket file; if the data source is GCS (Google Cloud Storage), the authentication secret is the associated JSON key file; and if the data source is AWS S3, the authentication secret is the associated Access keys (access key ID and secret access key).

The data daemon forwards the current user information to the data source during authentication to address possible cases of impersonation 424. Upon successful authentication and establishment of the connection between the data daemon and the data source, confirmation is provided that the connection has been established successfully 426. The data daemon may then proceed with the requested data access 428.

Figure 5:
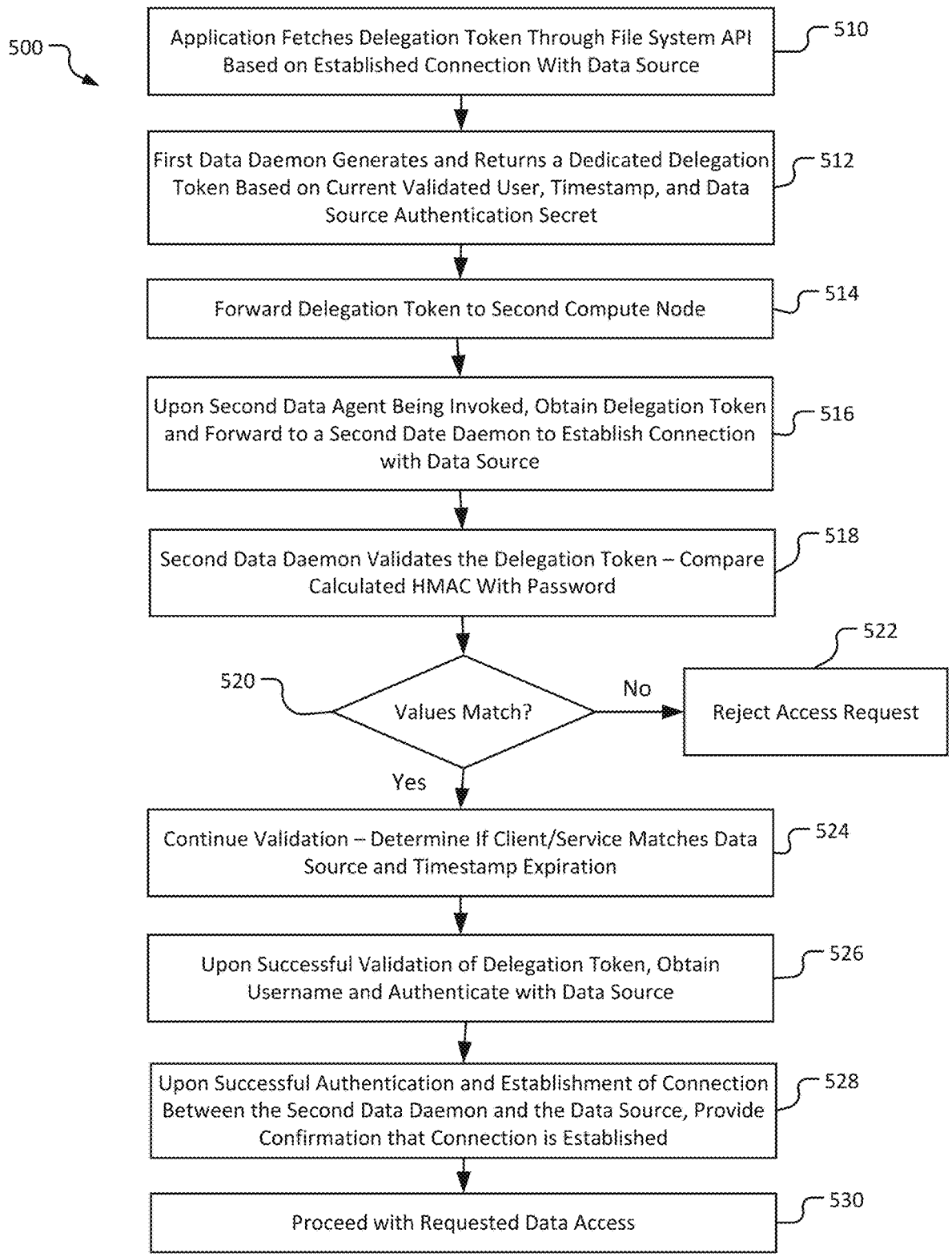
FIG. 5 is a flowchart to illustrate a process to provide secured data access in a virtual data processing environment, according to some examples.

FIG. 5 is a flowchart to illustrate a process to provide delegated data access in a virtual data processing environment, according to some examples. In some examples, an application may be spread among multiple nodes in a virtual compute cluster, which may include a first compute node including a first data agent and a second compute node including a second data agent. In process 500, following successful authentication with a data source, as illustrated in FIG. 4, the application may fetch a delegation token through a file system API based on the connection that has been established with the data source 510.

A first data daemon generates and returns a dedicated delegation token that is based on a current validated user, a timestamp, and the data source's authentication secret 512. The delegation token includes at least an identifier and password, wherein the identifier may include current data source service information (such as hostname or IP address), user information, timestamp (current and expired), and sequence number, and wherein the password may include an HMAC (Hash-based Message Authentication Code) signature based on the identifier and the data source's authentication secret. The process 500 may further include forwarding the delegation token to the second compute node 514, the second compute node including the second data agent.

Upon the second data agent being invoked by the application, the second data agent obtains the delegation token from its user context and forwards the delegation token to a second data daemon to establish a connection with the corresponding data source 516. Upon receiving the delegation token, the second data daemon validates the delegation token 518. In the validation, the second data daemon calculates a HMAC utilizing the identifier and the data source's authentication secret and compares the result with the password to determine if the values match. If the values don't match 520, this may indicate that the token has been tampered, and the second data daemon rejects the access request 522. If the values match, the second data daemon continues validation, determining if the requesting client or service matches the data source and checking if the timestamp has expired 524.

Upon successful validation of the delegation token, the second data daemon obtains the username from the validated token, and on behalf of the validated user, authenticates with the data source based on the data source's authentication information 526. Upon successful authentication with the data source and establishment of the connection between the second data daemon and the data source, the second data daemon confirms that the connection has been established successfully 528, and proceeds with the requested data access 530.

Figure 6:
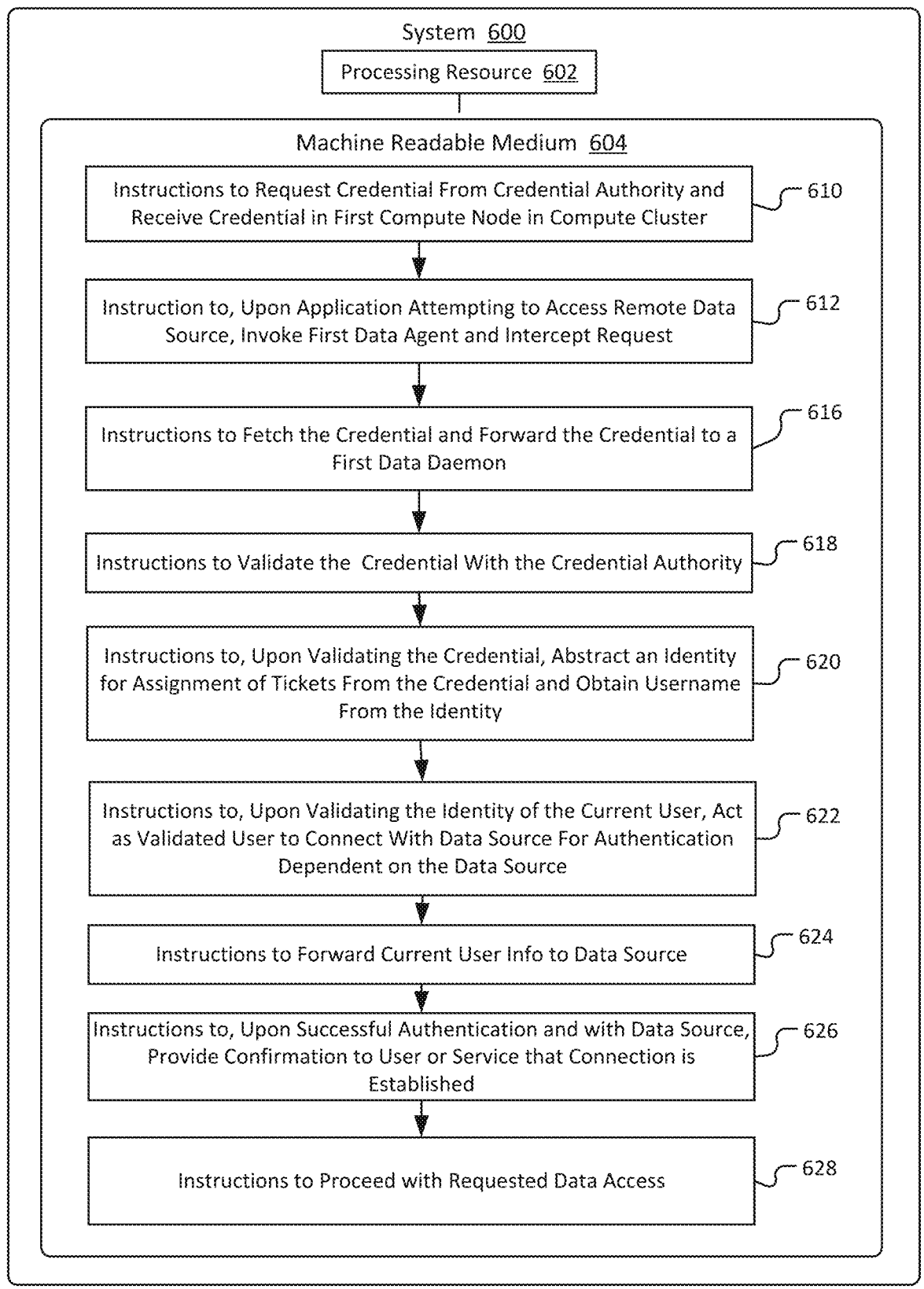
FIG. 6 depicts an example system to provide for secured data access in a virtual data processing environment, according to some examples.

FIG. 6 depicts an example system to provide for secure data access in a virtual data processing environment, according to some examples. An example system 600 includes a non-transitory, machine readable medium 604 encoded with example instructions 610, 612, 616, 618, 620, 622, 624, 626, and 628 (collectively referred to as instructions 610-628) executable by a processing resource 602. In some implementations, the system 600 may be useful for performing process 400 of FIG. 4.

The processing resource 602 may include a microcontroller, a microprocessor, central processing unit core(s), an ASIC (Application-Specific Integrated Circuit), an FPGA (Field-Programmable Gate Array), and/or other hardware device suitable for retrieval and/or execution of instructions from the machine readable medium 604 to perform functions related to various examples. Additionally or alternatively, the processing resource 602 may include or be coupled to electronic circuitry or dedicated logic for performing some or all of the functionality of the instructions.

The machine readable medium 604 may be any medium suitable for storing executable instructions, such as RAM (Random-Access Memory), ROM (Read-Only Memory), EEPROM (Electrically Erasable Programmable Read-Only Memory), flash memory, a hard disk drive, an optical disc, or the like. In some example implementations, the machine readable medium 604 may be a tangible, non-transitory medium. The machine readable medium 604 may be disposed within the system 600, in which case the executable instructions may be deemed installed or embedded on the system 600. Alternatively, the machine readable medium 604 may be a portable (e.g., external) storage medium, and may be part of an installation package.

As described further herein below, the machine readable medium 604 may be encoded with a set of executable instructions 610-628. It should be understood that part or all of the executable instructions and/or electronic circuits included within one box may, in alternate implementations, be included in a different box shown in the figures or in a different box not shown. Some implementations of the system 600 may include more or fewer instructions than are shown in FIG. 6.

Instructions 610, when executed, cause the processing resource 602 to request a credential (such as a Kerberos credential) from a credential authority (e.g., a KDC) and receive the credential at a first compute node within a virtual compute cluster, wherein the first compute node supports an application and wherein a first data agent is deployed in the compute node.

Instructions 612, when executed, cause the processing resource 602 to, upon the application attempting to access a remote data source, invoke the first data agent. Instructions 616, when executed, cause the processing resource 602 to fetch the credential in a current application context and forward the credential to a first data daemon to establish a connection with the corresponding data source. If the compute cluster is Kerberized, the data agent will be invoked in a Kerberos secured environment, and the data agent can fetch the Kerberos credential directly based on current Kerberos context. If the compute cluster is not Kerberized, the data agent finds the Kerberos credential actively by adding a customized configuration property to indicate the location of the Kerberos credential. If the credential is not found with the customized configuration, the data performs a search in a default directory. In some examples, to avoid providing the credential on each node of the compute cluster, the credential may be placed on a shared storage to be accessed by data agents on all nodes of the compute cluster.

Instructions 618, when executed, cause the processing resource 602 to validate the forwarded credential for the user directly with the credential authority. If a dedicated service principal is configured in the KDC, the data daemon uses the forwarded credential (such as the Kerberos credential) to obtain the service ticket. If no dedicated service principal is configured in the KDC, the data daemon renews the Kerberos credential with KDC.

Instructions 620, when executed, cause the processing resource 602 to, upon successfully validating the Kerberos credential, abstract the identity to which the credential authority can assign tickets (the Kerberos principal being the identity to which Kerberos can assign tickets) from the credential, and obtain the username from the identity (Kerberos principal).

Instructions 622, when executed, cause the processing resource 602 to, upon successfully validating the identity of the current user, act as a validated user to connect with data source for authentication, with the authentication mechanism being dependent on the data source. When configuring each data source, in addition to the necessary data source type and hostname/IP required to connect to the data source, the data source's authentication mechanism and the associated authentication secret are provided for authentication. For example, if the data source is HDFS, the authentication secret is the associated keytab file; if the data source is MapR storage, the authentication secret is the associated ticket file; if the data source is GCS (Google Cloud Storage), the authentication secret is the associated JSON key file; and if the data source is AWS S3, the authentication secret is the associated Access keys (access key ID and secret access key).

Instructions 624, when executed, cause the processing resource 602 to forward the current user information to the data source during authentication to address possible cases of impersonation. Instructions 626, when executed, cause the processing resource 602 to, upon successful authentication with the data source, provide confirmation to the user or service that the connection has been successfully established. Instructions 628, when executed, cause the processing resource 602 to proceed with the requested data access on behalf of the requesting client or service.

Figure 7:
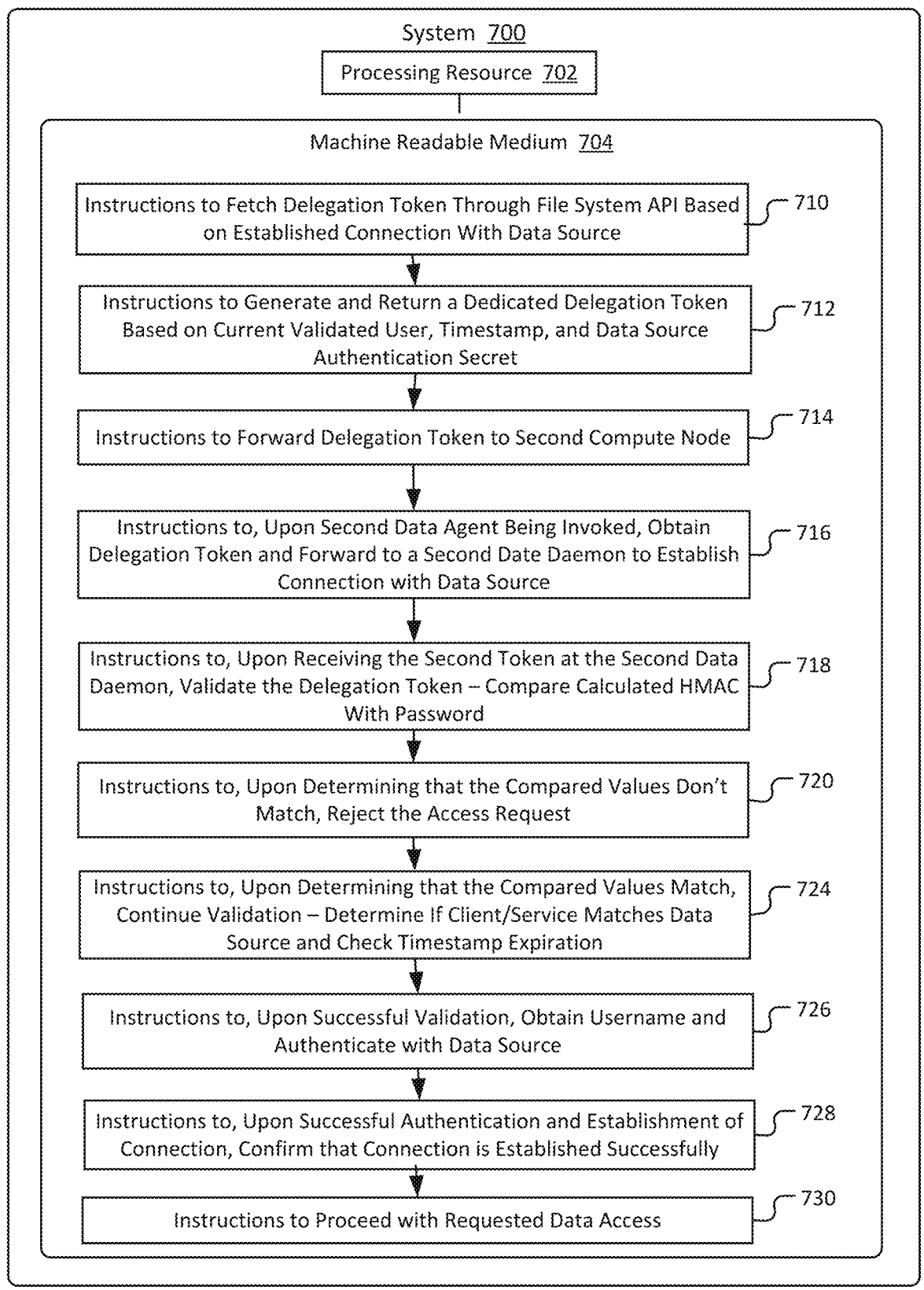
FIG. 7 depicts an example system to provide for secured data access in a virtual data processing environment, according to some examples.

FIG. 7 depicts an example system to provide for delegated data access in a virtual data processing environment, according to some examples. An example system 700 includes a non-transitory, machine readable medium 704 encoded with example instructions 710, 712, 714, 716, 718, 720, 724, 726, 728, and 730 (collectively referred to as instructions 710-730) executable by a processing resource 702. In some implementations, the system 700 may be useful for performing process 500 of FIG. 5.

The processing resource 702 and the machine readable medium 704 may be as described above for processing resource 602 and machine readable medium 604 in FIG. 6, and the relevant description is not repeated herein. As described further herein below, the machine readable medium 704 may be encoded with a set of executable instructions 710-730. It should be understood that part or all of the executable instructions and/or electronic circuits included within one box may, in alternate implementations, be included in a different box shown in the figures or in a different box not shown. Some implementations of the system 700 may include more or fewer instructions than are shown in FIG. 7.

Instructions 710, when executed, cause the processing resource 702 to fetch a delegation token through a file system API for a virtual compute cluster based on the connection that has been established by a first data daemon with a data source, the virtual compute cluster including nodes such a first compute node including a first data agent and a second compute node including a second data agent.

Instructions 712, when executed, cause the processing resource 702 to generate and return a dedicated delegation token that is based on a current validated user, a timestamp, and the data source's authentication secret. The delegation token includes at least an identifier and password, wherein the identifier may include current data source service information (such as hostname or IP address), user information, timestamp (current and expired), and sequence number, and wherein the password may include an HMAC (Hash-based Message Authentication Code) signature based on the identifier and the data source's authentication secret. Instructions 714, when executed, cause the processing resource 702 to forward the delegation token to the second compute node of the virtual compute cluster.

Instructions 716, when executed, cause the processing resource 702 to, upon the second data agent in the second compute node being invoked by an application, obtain the delegation token from the user context of the second data agent and forward the delegation token to a second data daemon to establish a connection with the corresponding data source.

Instructions 718, when executed, cause the processing resource 702 to, upon receiving the delegation token at the second data daemon, validate the delegation token. Validation of the delegation token includes calculating an HMAC utilizing the identifier and the data source's authentication secret and comparing the result with the password to determine if the values match. Instructions 720, when executed, cause the processing resource 702 to, upon determining that the compared values don't match, rejecting the access request. Instructions 724, when executed, cause the processing resource 702 to, upon determining that the compared values do match, continue the validation of the delegation token, determining if the requesting client or service matches the data source and check if the timestamp has expired.

Instructions 726, when executed, cause the processing resource 702 to, upon successful validation of the delegation token, obtain the username from the validated token, and on behalf of the validated user, authenticate with the data source based on the data source's authentication information. Instructions 728, when executed, cause the processing resource 702 to, upon successful authentication and establishment of the connection with the data source, confirm that the connection has been established successfully. Instructions 730, when executed, cause the processing resource 702 to proceed with the requested data access on behalf of the requesting client or service.

The following clauses pertain to further examples. Specifics may be applied anywhere in one or more examples. The various features of the different examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to examples described herein.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structure between illustrated components. The components described or illustrated herein may have additional inputs or outputs that are not illustrated or described.

Various examples may include various processes. These processes may be performed by hardware components or may be represented in computer program or machine-executable instructions, which may be used to cause a general-purpose or special-purpose processor or logic circuits programmed with the instructions to perform the processes. Alternatively, the processes may be performed by a combination of hardware and software.

Portions of various examples may be provided as a computer program product, which may include a computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, a non-transitory computer-readable storage medium has stored thereon data representing sequences of instructions that, when executed by a processor, cause the processor to perform certain operations.

Processes can be added to or deleted from any of the methods described above and information can be added or subtracted from any of the described messages without departing from the basic scope of the present examples. It will be apparent to those skilled in the art that many further modifications and adaptations can be made. The particular examples are not provided to limit the concept but to illustrate it. The scope of the examples is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An example is an implementation. Reference in the specification to "an example," "one example," "some examples," or "other examples" means that a particular feature, structure, or characteristic described in connection with the examples is included in at least some examples, but not necessarily all examples. The various appearances of "an example," "one example," or "some examples" are not necessarily all referring to the same examples. It should be appreciated that in the foregoing description of examples, various features are sometimes grouped together in a single example, figure, or description thereof for the purpose of streamlining the disclosure and aiding in the understanding of one or more of the various novel aspects. This method of disclosure, however, is not to be interpreted as reflecting an intention that the claimed examples requires more features than are expressly recited in each claim. Rather, as the following claims reflect, novel aspects lie in less than all features of a single foregoing disclosed example. Thus, the claims are hereby expressly incorporated into this description, with each claim standing on its own as a separate example.

What is claimed is:

1. A non-transitory computer-readable storage medium comprising instructions that upon execution cause a system to:
   intercept, by a first data agent in a first virtual compute node, a first request from an application in the first virtual compute node to access a secured data source for a requester, the first virtual compute node being one of a plurality of virtual compute nodes of a compute cluster in a virtual data processing environment including a plurality of secured data sources that are accessible by the plurality of virtual compute nodes, the secured data source being secured with a security authentication technology;
   forward, by the first data agent, the first request to a first data daemon outside the first virtual compute node;
   validate, by the first data daemon with a credential authority, a credential from a current application context associated with the first request;
   based on successfully validating the credential:
      authenticate, by the first data daemon, the requester using the security authentication technology for the secured data source,
      establish a connection with the secured data source for access by the application to the secured data source, and
      generate, by the first data daemon, a delegation token comprising a value based on an authentication secret of the secured data source;
   send the delegation token to a second virtual compute node of the plurality of virtual compute nodes;
   send, by a second data agent in the second virtual compute node, the delegation token to a second data daemon for a second request to access the secured data source intercepted by the second data agent;
   validate, by the second data daemon, the delegation token from the second data agent; and
   based on validating the delegation token, authenticate, by the second data daemon, with the secured data source for the requester that initiated the second request.

2. The non-transitory computer-readable storage medium of claim 1, wherein the plurality of secured data sources comprises a second secured data source that is secured with a second security authentication technology that is different than the security authentication technology for the secured data source.

3. The non-transitory computer-readable storage medium of claim 2, wherein the security authentication technology for the secured data source uses a first type of authentication secret, and the second security authentication technology for the second secured data source uses a second type of authentication secret different from the first type of authentication secret.

4. The non-transitory computer-readable storage medium of claim 1, wherein the first data agent implements an API (Application Programming Interface), and the first request to access the secured data source is made via the API.

5. The non-transitory computer-readable storage medium of claim 4, wherein the API includes a Hadoop Distributed File System (HDFS) API.

6. The non-transitory computer-readable storage medium of claim 1, wherein the credential is obtained from a shared storage, the shared storage being accessible to each virtual compute node of the compute cluster.

7. The non-transitory computer-readable storage medium of claim 1, wherein the value in the delegation token comprises a signature, and wherein the validating of the delegation token by the second data daemon comprises:
   calculating, by the second data daemon, a calculated signature based on the authentication secret of the secured data source, and
   comparing, by the second data daemon, the calculated signature to the signature in the delegation token.

8. The non-transitory computer-readable storage medium of claim 1, further comprising instructions that when executed cause the system to:
   request the credential from the credential authority and receive the credential at the first virtual compute node.

9. The non-transitory computer-readable storage medium of claim 8, wherein the credential is a Kerberos credential, and the credential authority is a Kerberos Key Distribution Center (KDC).

10. The non-transitory computer-readable storage medium of claim 1, wherein each of the first and second virtual compute nodes includes a container or a virtual machine.

11. A method comprising:
   intercepting, by a first data agent in a first virtual compute node, a first request from an application in the first virtual compute node to access a secured data source for a requester, the first virtual compute node being one of a plurality of virtual compute nodes of a compute cluster in a virtual data processing environment including a plurality of secured data sources that are accessible by the plurality of virtual compute nodes, the secured data source being secured with a security authentication technology;
   forwarding, by the first data agent, the first request to a first data daemon outside the first virtual compute node;
   validating, by the first data daemon with a credential authority, a credential from a current application context associated with the first request;

based on successfully validating the credential:
   authenticating, by the first data daemon, the requester using the security authentication technology for the secured data source,
   establishing a connection with the secured data source for access by the application to the secured data source, and
   generating, by the first data daemon, a delegation token comprising a value based on an authentication secret of the secured data source;
sending the delegation token to a second virtual compute node of the plurality of virtual compute nodes;
sending, by a second data agent in the second virtual compute node, the delegation token to a second data daemon for a second request to access the secured data source intercepted by the second data agent;
validating, by the second data daemon, the delegation token from the second data agent; and
based on validating the delegation token, authenticating, by the second data daemon, with the secured data source for the requester that initiated the second request.

12. The method of claim 11, wherein the plurality of secured data sources comprises a second secured data source that is secured with a second security authentication technology that is different than the security authentication technology for the secured data source.

13. The method of claim 11, wherein the delegation token is generated further based on a timestamp.

14. The method of claim 12, wherein the security authentication technology for the secured data source uses a first type of authentication secret, and the second security authentication technology for the second secured data source uses a second type of authentication secret different from the first type of authentication secret.

15. The method of claim 11, wherein the credential is a Kerberos credential, and the credential authority is a Kerberos Key Distribution Center (KDC).

16. A computing system comprising:
   a processor; and
   a non-transitory storage medium storing instructions executable on the processor to:
     intercept, by a first data agent in a first virtual compute node, a first request from an application in the first virtual compute node to access a secured data source for a requester, the first virtual compute node being one of a plurality of virtual compute nodes of a compute cluster in a virtual data processing environment including a plurality of secured data sources that are accessible by the plurality of virtual compute nodes, the secured data source being secured with a security authentication technology;
     forward, by the first data agent, the first request to a first data daemon outside the first virtual compute node;
     validate, by the first data daemon with a credential authority, a credential from a current application context associated with the first request; and
     based on successfully validating the credential:
       authenticate, by the first data daemon, the requester using the security authentication technology for the secured data source,
       establish a connection with the secured data source for access by the application to the secured data source, and
       generate, by the first data daemon, a delegation token comprising a value based on an authentication secret of the secured data source;
     send the delegation token to a second virtual compute node of the plurality of virtual compute nodes;
     send, by a second data agent in the second virtual compute node, the delegation token to a second data daemon for a second request to access the secured data source intercepted by the second data agent;
     validate, by the second data daemon, the delegation token from the second data agent; and
     based on validating the delegation token, authenticate, by the second data daemon, with the secured data source for the requester that initiated the second request.

17. The computing system of claim 16, wherein the plurality of secured data sources comprises a second secured data source that is secured with a second security authentication technology that is different than the security authentication technology for the secured data source.

18. The computing system of claim 17, wherein the security authentication technology for the secured data source uses a first type of authentication secret, and the second security authentication technology for the second secured data source uses a second type of authentication secret different from the first type of authentication secret.

19. The computing system of claim 16, wherein the value in the delegation token comprises a signature, and wherein the validating of the delegation token by the second data daemon comprises:
   calculating, by the second data daemon, a signature based on the authentication secret of the secured data source, and
   comparing, by the second data daemon, the calculated signature to the signature in the delegation token.

20. The computing system of claim 16, wherein the credential is a Kerberos credential, and the credential authority is a Kerberos Key Distribution Center (KDC).

\* \* \* \* \*